3,454,385
SINTERED ALPHA-ALUMINA AND ZIRCONIA
ABRASIVE PRODUCT AND PROCESS
John J. Amero, Shrewsbury, Mass., assignor to Norton Company, Worcester, Mass., a corporation of Massachusetts
No Drawing. Filed Aug. 4, 1965, Ser. No. 477,315
Int. Cl. C04b 25/02, 31/16
U.S. Cl. 51—298                               4 Claims

ABSTRACT OF THE DISCLOSURE

An abrasive composition suitable for heavy duty snagging includes 30 to 70% alumina, 15 to 60% zirconia, and 5 to 15% of one or more oxides of iron, titanium, manganese, and silicon. The material is preformed in the final desired shape before firing, fired to size and employed in the uncrushed state as tumbling media or as an abrasive grain for use in organic bonded grinding wheels.

---

The present invention relates to alumina-zirconia sintered abrasive product. More particularly, this invention relates to the production of alumina-zirconia sintered abrasive products having markedly improved grinding qualities for heavy duty grinding or snagging operations and to the production of alumina-zirconia sintered snagging abrasives that may be modified with selected sintering aids.

It is an object of this invention to provide a novel and improved snagging abrasive of high strength and hardness and great impact strength.

It is another object of this invention to provide an improved snagging abrasive having a high degree of durability and wear resistance.

It is a further object of this invention to provide a snagging abrasive that exhibits decreased wheel wear and increased material removal over snagging abrasives presently known.

Other and further objects of the present invention will become more apparent to those skilled in the art when reference is had to the following disclosure and specific examples.

It has now been found that the foregoing objects may be attained by combining the desirable properties of alpha-alumina and zirconia in a sintered abrasive product. It has further been found that additional advantages may be achieved by modifying these desirable properties of sintered alpha-alumina and zirconia abrasives with a significant amount of one or more selected modifying materials known as mineralizers or sintering aids. In this manner, an abrasive material is produced which improves upon the combined strength and hardness of alumina and the durability and wear resistance of zirconia to yield an abrasive product that is especially suitable for snagging operations.

More particularly, it has been found that alumina in either hydrated or calcined form, and a calcined zirconia with or without a significant amount of mineralizers or sintering aids as discussed hereinafter, may then be ground to a very fine particle size in the proportions indicated hereinafter. The fine particles are then agglomerated into a compressed mass by squeezing the fine particles together under pressure. Either prior or subsequent to pressing, the particles are arranged in grain or granule sizes and are thereafter subjected to sintering temperature which is below the melting points of alumina and zirconia. At such temperatures, crystal growth takes place to produce a coherent product of great strength.

The aluminum oxide from which the present product is made, is desirably pure, such as that produced by the Bayer process. In the Bayer process, the mineral bauxite as mined, is crushed and washed to remove clay and is then finely ground for charging into digesters along with dilute caustic liquor and sufficient lime and sodium carbonate to give the desired concentration of sodium hydroxide. After digestion under steam pressure, the caustic solution containing the alumina dissolved as sodium aluminate, is separated from the insoluble residue by settling and filtration. The sodium aluminate solution is sent to precipitation tanks where it is seeded with alumina trihydrate and slowly cooled. The trihydrate is gradually formed by the hydrolysis of sodium aluminate in the presence of the crystalline seed. When the precipitation cycle has been carried to the desired stage, the granular trihydrate is separated by thickeners and filters and then may be calcined to remove the free and combined water, but this is unnecessary since both the hydrated and calcined alumina products are suitable for use in the present invention.

The total alumina in the present sintered abrasive product is employed with approximtely equal parts by weight of zirconium oxide, based upon the amount of alumina. That is, the percentage of alumina may vary from about 30% to about 70% and the precentage of zirconia may vary from below about 15% to as high as about 60%, although preferred ranges for both materials normally lie in the range of about 40% to about 60%.

Although it is not essential to the outcome of this invention, it is also understood that one or more other selected refractory oxides, known as mineralizers or sintering aids, may be added to the mixture of alumina and zirconia, and many materials are known which act as sintering aids. Among the many known mineralizers however, only four have been found suitable for use herein that do not hinder the present combination of alumina and zirconia, and may advantageously influence the outcome. These materials are ferric oxide, titanium dioxide, manganese dioxide and silicon dioxide.

What is meant by a "significant" amount of the modifying oxides has not as yet been exactly determined, but it is known that an amount in excess of five percent (5%) should be desirably be employed and that cumulative amounts in the range of ten (10) and even fifteen (15) percent appear to be very beneficial. It is also believed that amounts greatly in excess of fifteen percent are to be avoided and that cumulative levels of about 10% are generally preferred.

The powdered materials, including alumina, zirconia and a significant amount of at least one of the modifying oxides, either pre-mixed or individually charged, are inserted into a conventional mixing and grinding device, for example, a ball mill, along with a sufficient amount of water within the range of about 70 to about 100 percent, based on the combined weight of the charged powders, to produce a uniform and homogenous slurry. Although mixing may be completed in a relatively few hours, it is usually carried out for up to about 24 hours to completely insure homogeneity and uniformity as is understood in the art.

This slurry, now containing the somewhat hydrated oxides of the several materials charged, is then dried in a hot air or other type oven, or in a tumbler drier to a powderable stage and a moisture content within the range of about 1 to about 5 percent, based on the weight of total oxides originally charged, although a dryness of about 2 to about 4 percent by weight is preferred. The drying apparatus employed, like the ball mill above described, is not an essential feature of this invention as is well understood, since these devices are usual in the art.

Due to the completeness of the sintering operation, it is desirable that the shape of the ultimate article, in this case abrasive granules, be determined prior to sintering and this is preferably accomplished during or immediately following the necessary compression stage.

According to one preferred procedure employed in the present invention, shaping can be accomplished by first mixing the dried slurry above referred to with a temporary volatile binder to form a moldable plastic mass. By this type of binder is meant a material that will completely evaporate and/or carbonize and gasify at the firing temperatures described hereinbelow. Within such a definition, there will be found various inorganic and organic binders, although organic binders such as resins, gums, waxes, and various cellulosic materials are preferred since their complete volatility is insured at temperatures above about 1000° C. which are employed herein.

This plastic mass may then be subjected to the necessary compression, and following compression, the pressed mass may be reduced to abrasive granule sized masses, prior to sintering.

According to another procere for the present invention, the dried slurry above referred to may be directly subjected to pressure without employing temporary binders. Economy may be achieved by eliminating the use of a binder and the normally attendant drying operations. The dried slurry is thus directly subjected to pressure to provide a highly compressed "green" cake of the mixed oxide particles. This cake is then broken, with the aid of a blunt instrument, into "green" granules of the desired size, the granules each being comprised of an agglomeration of oxide particles tightly pressed together.

The compression and granulation procedure may be replaced by other known procedures that also yield "green" sulf-sustaining granular elements with the above-identified composition of refractory oxides and additives with or without a temporary binder. For example, in another preferred practice, a temporary binder and dried slurry may be first mixed in any conventional mixer, for example, a ball mill. The plastic mass produced may then be disintegrated by atomizing, spraying or prilling to form discrete droplets which may be pressed and then dried by contact with a hot gas, or by spraying into a hot air oven, or by oven drying the thus produced prills, to get a granular product as above described. It is only necessary that such degree of pressure be employed in the order of from about 1000 pounds/square inches to about 5 tons or more/square inches, to insure that the particular oxide materials are in contact one with another and are not separated by an intervening coating of temporary volatile binder. The only limit on the amount of pressure to be applied is the limitation of the apparatus employed.

The green grains thus produced may have random shapes and be of any desired size. Also specifically shaped objects may be formed and fired as hereinafter taught to form hard wear resistant objects for use as tumbling abrasives and for other purposes. Generally, granules produced by compression and fracturing, extrusion, or spraying processes as outlined above are preferred in terms of cost and simplicity. However, by moulding or pelleting procedures, a powder and binder mass may be formed into pyramidic, cubic, or other shaped particles which may be fired in the sagger either in loose form or in a shape-retaining mold.

Following granulation, the granules are placed in clay boxes or refractory saggers, as is understood in the art, to protect the granules from damage and the effects of soot and dust during sintering. The saggers are then placed in a suitable oven and the granules are fired at temperatures above about 1000° C. and within the range of 1200° C. to 1500° C. to volatilize moisture, any temporary binder employed, and oxygen from any manganese dioxide, and permit the refractory oxide particles contained in each granule to mutually sinter and recrystallize at mutual points of substantial contact and form into self bonded abrasive granules or grain sized masses. Alternatively, a rotary kiln may be employed.

After the granules have been fired to produce the finished product, conventional bonding agents can be employed to produce a final molded grinding product such as a grinding wheel from the granule type abrasive of the present invention.

The conventional bonding agent used in forming final products, such as grinding wheels, from the sintered abrasive granules of the present invention, as well as for forming grinding wheels from standard fused abrasives for comparison purposes, will include such well known "natural" materials as natural rubber and shellac, and conventional ceramic bonds, as well as synthetic thermosetting resins of the formaldehyde type including urea formaldehyde, melamine formaldehyde and phenol formaldehyde; butadiene and styrene-acrylonitrile type synthetic rubbers and various polyester, alkyd and epoxy type thermosetting materials. Understandably, the resinous materials may be used singly, or in mixtures and combinations for bonding the present sintered abrasive granules into a structural grinding product. It is also understood that these materials, either alone, or in mixtures, may be employed and cured according to procedures well known in the art.

The understanding of this invention will now be facilitated by reference to the following examples which are given by way of illustration and are not to be considered in a limiting sense. It is to be understood that weights of manganous oxide, where employed, are given in terms of the dioxide starting material and that the ultimate weight of manganous oxide in the sintered result can only be estimated by empirical calculations.

The examples also deal with the preparation of grinding wheel shapes with the aid of conventional bonding procedures for ease of comparison with commercially available fused abrasive products. The comparison is based on the grinding quality of grinding wheels prepared from both the sintered granule product of this invention, and from conventional fused granules. The grinding quality G is defined by the relationship:

$$G = M^2/W$$

where M is the amount of material removed measured in pounds per hour, and W is the amount of wheel wear measured in cubic inches per hour.

EXAMPLE 1

A mixture was prepared from the following powdered materials:

| Material: | Percentage parts by weight |
|---|---|
| Bayer process alpha-alumina | 44.5 |
| Fused zirconium dioxide | 44.5 |
| Titanium dioxide | 0.5 |
| Ferric oxide | 10.5 |
| | 100.0 |

These materials were charged into a ball mill with an equal weight of water and milled for twenty-four hours. The resulting slurry was then dried to about 3 percent moisture content and the cake thus produced was powdered by hand. The dry powder was placed in a suitable 7″ diameter cylindrical die and a pressure of 5 tons per square inch was exerted on the powder, there being several bumping steps to complete the pressing. A 1½″ thick cake resulted which was then stripped from the die.

The "green" cakes were placed on an oscillating screen and were repeatedly struck with a blunt instrument which was wielded manually so the cakes were broken down into granules of a size to fall through the screen, thus obtaining a maximum yield with a minimum of unwanted fines. The granules were each comprised of an agglomeration of particles tightly pressed together. These agglomerated masses were then sized through a nest of screens and those passing through 6 mesh screen and retained on a 16 mesh screen were collected. The other sizes of "green" agglomerates were recycled.

The collected agglomerates were placed in a refractory sagger and fired at temperatures up to 1325° C. with a four hour soak at the top temperature to produce the desired abrasive granules. After firing, the sintered granules were used for making eight phenolic resin bonded test wheels by conventional bonding procedures. Conventional fused alumina abrasive granules were also made into similarly sized grinding wheels with the same bonding procedure. Both sintered and fused granule wheels were then tested for snagging operations on an eight inch swing frame grinder, at a wheel speed of 9500 surface feet per minute with 85 pounds total grinding pressure to grind 18–8 stainless steel. The results are listed below.

Type of wheel:                                       Grinding quality
  Test wheel with sintered granules of this invention _____ 95
  Standard wheel with fused alumina abrasive granules _____ 28

The results show that the present invention achieved a marked superiority over standard fused products.

EXAMPLE 2

The milling and forming procedures of Example 1 above were repeated using the following powdered compositions:

Material:                           Percentage parts by weight
  Bayer process alpha-alumina _____ 41.8
  Zirconium dioxide _____ 41.8
  Titanium dioxide _____ 0.7
  Ferric oxide _____ 15.7
                                            ―――
                                            100.0

The firing temperature in this case was 1325° C. with a four hour hold at the top temperature. The same phenolic resin bonded wheel specifications were used for test grinding with both the present sintered granules and standard fused granules with the following results.

Type of wheel:                                       Grinding quality
  Test wheel with sintered abrasive granules _____ 81
  Standard wheel with fused abrasive granules ____ 28

These results again show a very marked improvement over the standard.

EXAMPLE 3

The procedure of Example 1 above was again repeated with the following powdered composition:

Material:                           Percentage parts by weight
  Bayer process alpha-alumina _____ 44.7
  Zirconium dioxide _____ 44.7
  Titanium dioxide _____ 4.2
  Ferric oxide _____ 6.4
                                            ―――
                                            100.0

The firing temperature in this case was 1400° C. A grinding quality of 57 was found for the sintered product, compared to a grinding quality of 34 for the standard product.

EXAMPLE 4

A mixture was prepared from the following powdered composition:

Powdered component:                 Percentage parts by weight
  Bayer process alpha-alumina _____ 45.0
  Fused zirconium dioxide _____ 44.0
  Titanium dioxide _____ 2.7
  Ferric oxide _____ 4.3
  Silicon dioxide _____ 4.0
                                            ―――
                                            100.0

These materials were charged into a ball mill with approximately an equal weight of water and milled for 24 hours. The resulting slurry was then dried to about 2% moisture content and the cake thus produced was powdered by hand, although machine powdering operations can be employed for commercial production. The powder was mixed with about 3% by weight of a cellulosic type organic binder to a plastic state. This plastic mass was then extruded in a vertical extrusion machine at a pressure of about 15 tons on a 30-inch chamber. A column or rod of mixture about one-sixteenth inch diameter was extruded and these extruded rods were cut by hand to roughly equal size grains which were dried to cure the binder somewhat and give firm granules. This cutting may also be mechanically performed. These granules were placed in a refractory sagger and sintered by firing at temperatures up to 1400° C. with a 4 hour soak at the top temperature. After firing, the sintered granules were used for making test wheels by conventional bonding procedures for the manufacture of snagging grinding wheels as is well known in the art.

The procedure for bonding, and the bonding resin employed, were identical to those employed for forming a conventional phenolic resin bonded grinding wheel having a fused snagging abrasive therein. Both the wheels of this invention and the conventional wheels were tested at "snagging" conditions in the standard manner of use on an eight inch swing frame grinder running the wheel to have a speed of 9500 surface feet per minute and 85 pounds total grinding pressure, to grind 18–8 stainless steel. The results are listed in the table below:

Type of wheel:                                       Grinding quality
  Test wheel with sintered abrasive granules _____ 55
  Standard wheel with fused abrasive granules ____ 24

The results show that the present invention achieves a marked superiority over standard fused products.

EXAMPLE 5

The milling and forming procedures of Example 4 above were repeated using the following composition:

Composition:                               Parts by weight
  Bayer process alpha-alumina _____ 43.7
  Zirconium dioxide _____ 47.2
  Manganese dioxide _____ 3.6
  Silicon dioxide _____ 1.9
                                            ―――
                                            95.4

The firing temperature for sintering in this case ranged as high as 1450° C. with a four hour soak or hold at the maximum temperature. The same wheel specifications were used for test grinding with both a conventional wheel and a wheel containing the present sintered granules at snagging conditions, with the following results:

Type of wheel: Grinding quality
    Test wheel with sintered abrasive granules _____ 45
    Standard wheel with fused abrasive granules ___ 24

These results again show a marked improvement over the standard fused product.

EXAMPLE 6

The procedure of Example 4 was again repeated with the following powdered composition:

| Material: | Percentage parts by weight |
|---|---|
| Bayer process alpha-alumina | 44.8 |
| Zirconium dioxide | 44.8 |
| Titanium dioxide | 6.8 |
| Ferric oxide | 3.6 |
| | 100.0 |

The firing temperature in this case was 1400° C. A grinding quality of 44 was found for the sintered product, compared to a grinding quality of 27 for the standard product.

The results of Examples 1 to 6 above show very marked improvements of the present sintered product over the standard fused product with the use of significant amounts of selected modifying oxides, that is, above about five percent. Examples 7 through 13 below are given to illustrate the comparative advantage achieved with varying amounts of alumina, zirconium dioxide, ferric oxide, titanium dioxide, and manganese dioxide. Due to differences in wheel size, the following examples cannot be directly compared with the eight inch wheels tested above however, and only serve to illustrate combining proportions.

EXAMPLE 7

The procedure of Example 1 above was again repeated with the following powdered composition:

| Material: | Percentage parts by weight |
|---|---|
| Bayer process alpha-alumina | 45.0 |
| Zirconium dioxide | 45.0 |
| Titanium dioxide | 0.5 |
| Ferric oxide | 9.5 |
| | 100.0 |

For this example, the above, powdered materials after mixing, compression and granulation as in Example 1, were then fired at 1360° C. and following firing, were used for making sixteen inch test wheels by conventional bonding procedures. These larger size wheels were subsequently tested at snagging conditions on stainless steel.

EXAMPLE 8

The procedure of Example 7 above was repeated with the following powdered composition:

| Material: | Percentage parts by weight |
|---|---|
| Bayer process alpha-alumina | 45.0 |
| Zirconium dioxide | 45.0 |
| Titanium dioxide | 4.2 |
| Ferric oxide | 5.8 |
| | 100.0 |

The firing temperature in this case was also 1360° C.

EXAMPLE 9

The procedure of Example 7 above was again repeated with the following powdered composition:

| Material | Percentage parts by weight |
|---|---|
| Bayer process alpha-alumina | 45.0 |
| Zirconium dioxide | 45.0 |
| Titanium dioxide | 3.4 |
| Manganese dioxide | 6.6 |
| | 100.0 |

The sintering temperature for the granules in this case was 1250° C.

EXAMPLE 10

The procedure of Example 7 above was again repeated with the following powdered composition:

| Material | Percentage parts by weight |
|---|---|
| Bayer process alpha-alumina | 45.0 |
| Zirconium dioxide | 45.0 |
| Titanium dioxide | 6.3 |
| Manganese dioxide | 3.7 |
| | 100.0 |

The granule sintering temperature for this example was 1300° C.

EXAMPLE 11

The procedure of Example 7 above was again repeated with the following powdered composition:

| Material | Percentage parts by weight |
|---|---|
| Bayer process alpha-alumina | 46.5 |
| Zirconium dioxide | 46.5 |
| Titanium dioxide | 0.35 |
| Ferric oxide | 6.65 |
| | 100.00 |

The granule sintering temperature in this case was 1400° C.

EXAMPLE 12

The procedure of Example 7 above was again repeated with the following powdered composition:

| Material | Percentage parts by weight |
|---|---|
| Bayer process alpha-alumina | 35.0 |
| Zirconium dioxide | 55.0 |
| Titanium dioxide | 0.5 |
| Ferric oxide | 9.5 |
| | 100.0 |

The granule sintering temperature in this case was 1350° C.

EXAMPLE 13

The procedure of Example 4 above was again repeated with the following powdered composition:

| Material | Percentage parts by weight |
|---|---|
| Bayer process alpha-alumina | 35.0 |
| Zirconium dioxide | 55.0 |
| Titanium dioxide | 3.4 |
| Manganese dioxide | 6.6 |
| | 100.0 |

The granule sintering temperature in this case was 1300° C.

It should, therefore, be understood that the foregoing detailed description and specific examples, while indicating preferred embodiments of the invention, are given by way of illustration only, since various changes and modifications may be made within the limits of this disclosure without departing from the spirit and scope of the following claims.

What is claimed is:

1. A sintered abrasive grain product consisting essentially of 85 to 95% of a mixture of about equal parts by weight of alpha-alumina and zirconia and from 5 to 15% of at least one member selected from the group consisting of ferric oxide, titanium dioxide, manganese dioxide, and silicon dioxide.

2. An abrasive product suitable for use in snagging operations comprising a rigid and coacting combination of bonding agent selected from the group consisting of shellac, natural rubber, synthetic rubber and polyester, alkyd, epoxy, melamine formaldehyde, urea formaldehyde, and phenol formaldehyde thermosetting resinous materials, and a plurality of sintered abrasive granules, said sintered abrasive granules consisting essentially of approximately equal parts by weight of alpha-alumina and zirconia, and from 5 to 15% of at least one member selected from the group consisting of ferric oxide, titanium dioxide, manganese dioxide, and silicon dioxide, said bonding agent retaining the sintered abrasive granules in the form of an abrasive product.

3. A process for producing a sintered abrasive product comprising the steps of mixing powdered alpha-alumina and powdered zirconia and at least two oxide members selected from the group consisting of ferric oxide, titanium dioxide, manganese dioxide, and silicon dioxide with a sufficient amount of water to form a slurry, drying the slurry to a powderable state, reducing the dried powder under pressure to granular form and sintering the pressed powder at 1200° C. to 1500° C. to produce hardened abrasive granules consisting essentially of from 30 to 70% by weight of alpha alumina, from 15 to 60% by weight of zirconia, and from 5 to 15% by weight total of said oxide members.

4. The process of claim 3 including at least 5% by weight of ferric oxide and a minor amount of titanium dioxide.

References Cited
UNITED STATES PATENTS

| | | | |
|---|---|---|---|
| 2,842,447 | 7/1958 | Schlotzhauer et al. | 106—65 |
| 2,905,564 | 9/1959 | Roup et al. | 106—65 |
| 2,947,056 | 8/1960 | Csordas | 51—309 |
| 3,156,545 | 11/1964 | Kistler et al. | 51—298 |
| 3,181,939 | 5/1965 | Marshall | 51—309 |

DONALD J. ARNOLD, *Primary Examiner.*

U.S. Cl. X.R.

51—299, 300, 309; 106—57, 65